(12) United States Patent
Hung et al.

(10) Patent No.: US 9,399,456 B2
(45) Date of Patent: Jul. 26, 2016

(54) HYBRID ELECTRIC VEHICLE

(71) Applicant: National Taiwan Normal University, Taipei (TW)

(72) Inventors: Yi-Hsuan Hung, Taipei (TW); Chao-Fu Shu, Taipei (TW); Bo-Lin Liao, Erlun Township (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 34 days.

(21) Appl. No.: 14/460,383

(22) Filed: Aug. 15, 2014

(65) Prior Publication Data

US 2015/0258980 A1 Sep. 17, 2015

(30) Foreign Application Priority Data

Mar. 12, 2014 (TW) .............................. 103108737 A

(51) Int. Cl.

| | | |
|---|---|---|
| *B60W 10/26* | (2006.01) | |
| *B60L 11/18* | (2006.01) | |
| *B60L 3/04* | (2006.01) | |
| *B60L 3/00* | (2006.01) | |
| *B60K 6/46* | (2007.10) | |
| *B60L 11/12* | (2006.01) | |
| *B60W 10/08* | (2006.01) | |
| *B60W 10/06* | (2006.01) | |

(52) U.S. Cl.
CPC .................. *B60W 10/26* (2013.01); *B60K 6/46* (2013.01); *B60L 3/0046* (2013.01); *B60L 3/04* (2013.01); *B60L 11/123* (2013.01); *B60L 11/1853* (2013.01); *B60L 11/1861* (2013.01); *B60L 11/1864* (2013.01); *B60W 10/06* (2013.01); *B60W 10/08* (2013.01); *B60W 20/13* (2016.01); *B60W 2710/244* (2013.01); *Y02T 10/6286* (2013.01); *Y10S 903/93* (2013.01)

(58) Field of Classification Search
CPC ... B60W 20/106; B60W 10/08; B60W 10/26; B60W 10/06; Y10S 903/93
USPC .......................................................... 701/22
See application file for complete search history.

(56) References Cited

U.S. PATENT DOCUMENTS

| | | | | |
|---|---|---|---|---|
| 6,105,696 A | * | 8/2000 | Chen ....................... | B60L 15/20 180/65.1 |
| 9,114,714 B2 | * | 8/2015 | Pham | |
| 2005/0255968 A1 | * | 11/2005 | Sah ........................ | B60K 6/445 477/200 |
| 2011/0100735 A1 | * | 5/2011 | Flett ........................ | B60K 6/46 180/65.22 |
| 2011/0144840 A1 | * | 6/2011 | Ye ............................ | B60K 6/46 701/22 |
| 2011/0174278 A1 | * | 7/2011 | Watanabe ............. | B60W 10/06 123/565 |

(Continued)

FOREIGN PATENT DOCUMENTS

JP WO2013/021486 A1 2/2013

*Primary Examiner* — Rodney Butler
*Assistant Examiner* — Frederick Brushaber
(74) *Attorney, Agent, or Firm* — Birch, Stewart, Kolasch & Birch, LLP

(57) ABSTRACT

A hybrid electric vehicle includes a wheel, a wheel driving device coupled with the wheel and including an electric motor, a battery unit including a first battery and a second battery, a generator for recharging the first battery and the second battery, a fuel engine operable to drive the generator to generate electricity, a first switch for establishing electrical connection between the generator and each of the first battery and the second battery, a second switch for establishing electrical connection between the electric motor and each of the first battery and the second battery, and a control unit operable to control the first switch and the second switch to make or break electrical connection.

10 Claims, 3 Drawing Sheets

(56) References Cited

U.S. PATENT DOCUMENTS

| | | | |
|---|---|---|---|
| 2012/0049771 A1* | 3/2012 | Komatsu | B60K 6/442 318/139 |
| 2012/0169129 A1* | 7/2012 | Kim | H01M 4/485 307/80 |
| 2012/0187919 A1* | 7/2012 | Andersson | B60K 6/46 320/138 |
| 2012/0259490 A1* | 10/2012 | Yang | B60W 20/13 701/22 |
| 2012/0262105 A1* | 10/2012 | Atkins | B60K 6/00 320/103 |
| 2012/0323421 A1 | 12/2012 | Avery | |
| 2013/0030634 A1* | 1/2013 | Endo | B60K 6/46 701/22 |
| 2013/0038271 A1* | 2/2013 | Park | B60K 6/28 320/104 |

* cited by examiner

HYBRID ELECTRIC VEHICLE

CROSS-REFERENCE TO RELATED APPLICATION

This application claims priority of Taiwanese application no. 103108737, filed on Mar. 12, 2014.

BACKGROUND OF THE INVENTION

1. Field of the Invention

The present invention relates to a hybrid electric vehicle.

2. Description of the Related Art

Referring to FIG. 1, a conventional electric vehicle has wheels 93 and an electric motor 91 that drives rotation of the wheels 93 through a transmission unit 92, and that receives electricity from a battery 94. By using the battery 94 as a power source for the electric motor 91, air pollution attributed to vehicles having conventional fuel (such as gasoline, diesel, etc.) engines may be prevented.

However, once the battery 94 is drained, the electric vehicle has to be moved to a specific location that has battery recharging equipment, creating inconvenience. Thus, a hybrid electric vehicle is proposed to resolve such inconvenience.

SUMMARY OF THE INVENTION

The object of the present invention is to provide a hybrid electric vehicle having a generator to charge a battery unit.

Accordingly, the hybrid electric vehicle of this invention includes a wheel, a wheel driving device, a battery unit, a generator, a fuel engine, a first switch, a second switch, and a control unit. The wheel driving device is coupled with the wheel for driving rotation of the wheel, and the wheel driving device includes an electric motor. The battery unit provides electricity to the electric motor, and the battery unit includes a first battery and a second battery that are rechargeable. The generator recharges the first battery and the second battery. The fuel engine is coupled with the generator and is operable to drive the generator to generate electricity. The first switch establishes electrical connection between the generator and each of the first battery and the second battery. The second switch establishes electrical connection between the electric motor and each of the first battery and the second battery. The control unit is electrically coupled with the first switch and the second switch and is operable to control the first switch and the second switch to make or break electrical connection.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
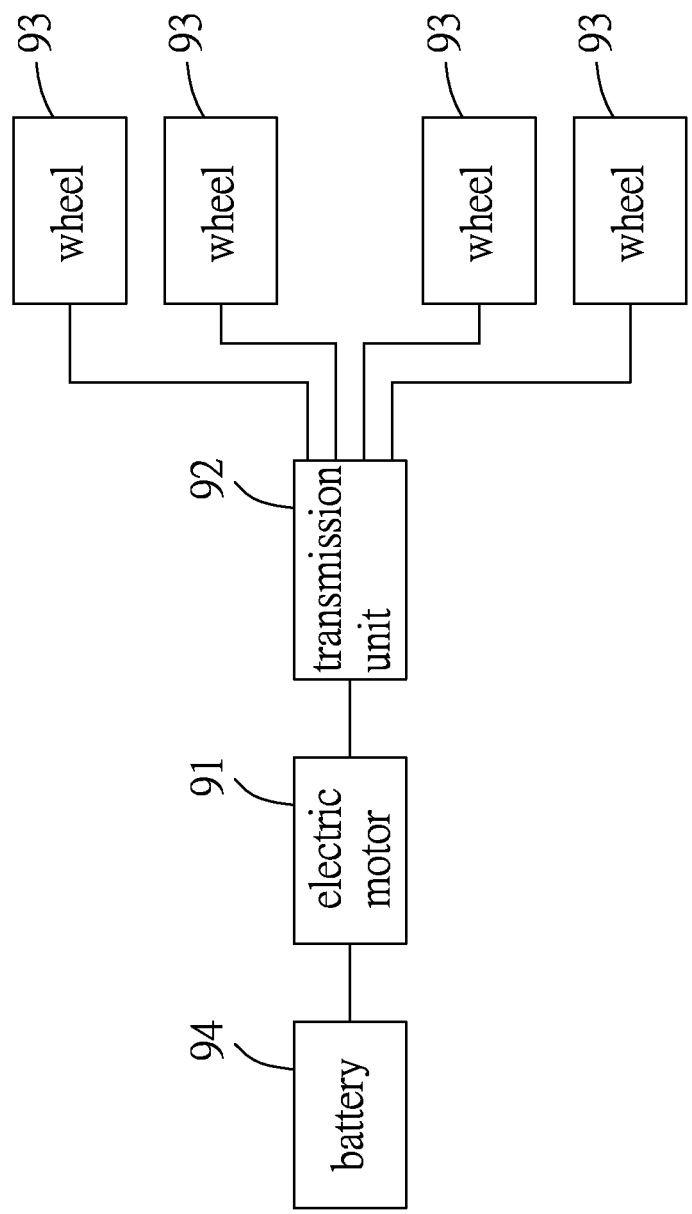
FIG. 1 is a schematic block diagram illustrating a conventional electric vehicle.
Figure 2:
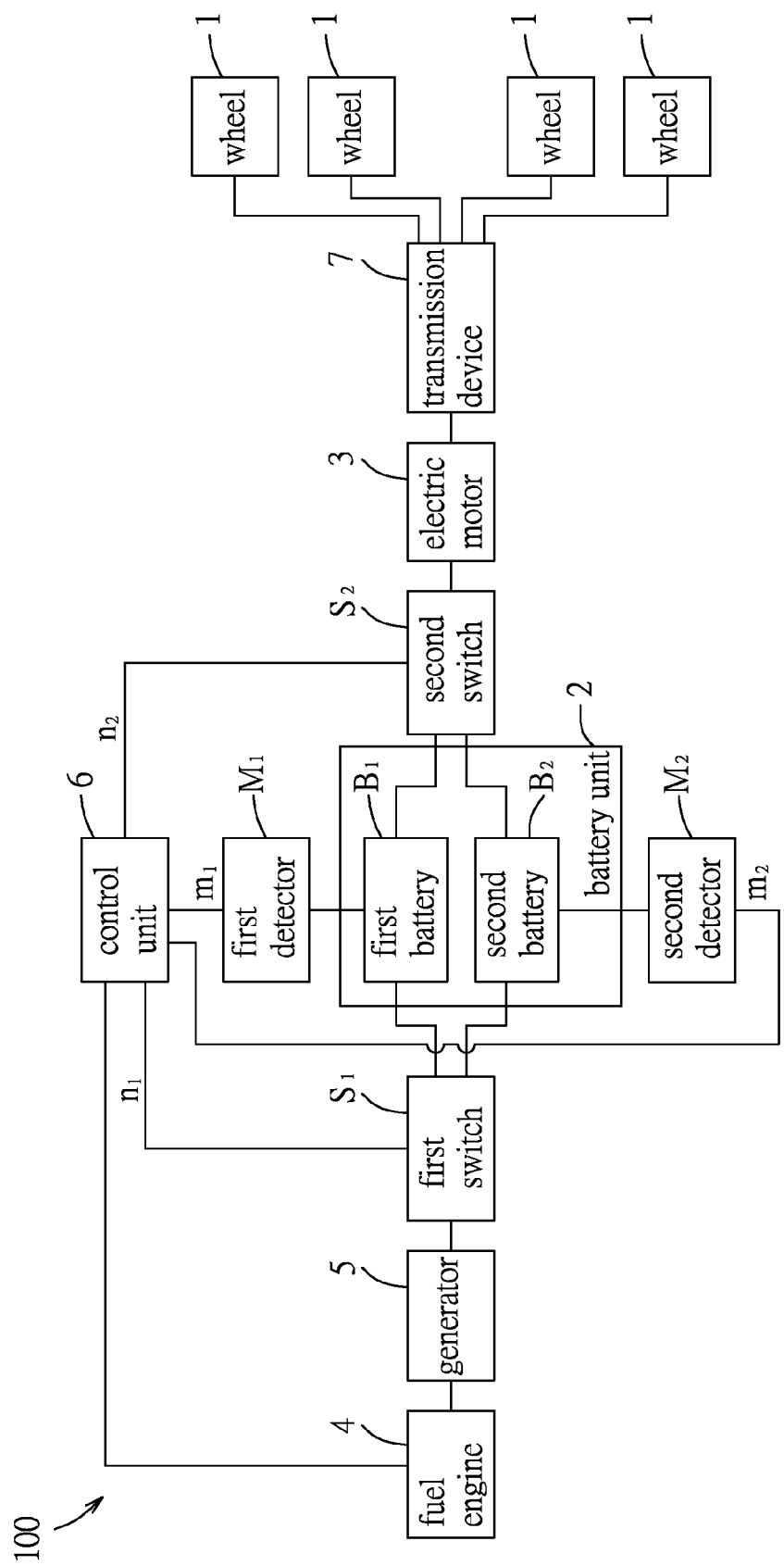
FIG. 2 is a schematic block diagram illustrating a preferred embodiment of a hybrid electric vehicle in the present invention.

Referring to FIG. 2, a hybrid electric vehicle 100 in a preferred embodiment of the present invention includes a plurality of wheels 1, a battery unit 2, an electric motor 3, a fuel engine 4, a generator 5, a first switch $S_1$, a second switch $S_2$, a control unit 6, a first detector $M_1$, a second detector $M_2$, and a transmission device 7. In this embodiment, the hybrid electric vehicle 100 has four wheels, but is not limited to having four.

The transmission device 7 is coupled between the electric motor 3 and each of the wheels 1, and cooperates with the electric motor 3 to form a wheel driving device. The electric motor 3 receives electricity from the battery unit 2, and the electric motor 3 drives, through the transmission device 7, the wheels 1 to rotate. The generator 5 is coupled with the fuel engine 4 and is driven by the fuel engine 4 to generate electricity for charging the battery unit 2.

The battery unit 2 includes a first battery $B_1$ and a second battery $B_2$ that are rechargeable. The first switch $S_1$ has a first terminal electrically coupled with the first battery $B_1$, a second terminal electrically coupled with the second battery $B_2$, a third terminal electrically coupled with the generator 5, and a fourth terminal electrically coupled the control unit 6 for receiving a first control signal $n_1$. The second switch $S_2$ has a first terminal electrically coupled with the first battery $B_1$, a second terminal electrically coupled with the second battery $B_2$, a third terminal electrically coupled with the electric motor 3, and a fourth terminal electrically coupled with the control unit 6 for receiving a second control signal $n_2$.

The control unit 6 controls the first switch $S_1$ such that the first battery $B_1$ and the second battery $B_2$ are not connected to the generator 5 at the same time, and controls the second switch $S_2$ such that the first battery $B_1$ and the second battery $B_2$ are not connected to the electric motor 3 at the same time.

Specifically, the control unit 6 is operable to control the first switch $S_1$ to either electrically connect the third terminal of the first switch $S_1$ with the first terminal of the first switch $S_1$ and electrically disconnect the third terminal of the first switch $S_1$ with the second terminal of the first switch $S_1$ such that recharging of the first battery $B_1$ by the generator 5 is enabled, or electrically connect the third terminal of the first switch $S_1$ with the second terminal of the first switch $S_1$ and electrically disconnect the third terminal of the first switch $S_1$ form the first terminal of the first switch $S_1$ such that recharging of the second battery $B_2$ by the generator 5 is enabled.

The control unit 6 is further operable to control the second switch $S_2$ to either electrically connect the third terminal of the second switch $S_2$ with the first terminal of the second switch $S_2$ and electrically disconnect the third terminal of the second switch $S_2$ with the second terminal of the second switch $S_2$ such that the first battery $B_1$ is able to supply electricity to the electric motor 3, or electrically connect the third terminal of the second switch $S_2$ with the second terminal of the second switch $S_2$ and electrically disconnect the third terminal of the second switch $S_2$ from the first terminal of the second switch $S_2$ such that the second battery $B_2$ is able to supply electricity to the electric motor 3.

The first detector $M_1$ is electrically coupled with the control unit 6 and the first battery $B_1$, and is operable to detect a battery level of the first battery $B_1$ and to generate a first detector signal $m_1$ that is based on the battery level of the first battery $B_1$. The second detector $M_2$ is electrically coupled with the control unit 6 and the second battery $B_2$, and is operable to detect a battery level of the second battery $B_2$ and to generate a second detector signal $m_2$ that is based on the battery level of the second battery $B_2$.

The control unit 6 is electrically coupled with the fuel engine 4, the fourth terminal of the first switch $S_1$, the fourth terminal of the second switch $S_2$, the first detector $M_1$ and the second detector $M_2$. The control unit 6 controls operations (activation/deactivation) of the fuel engine 4, and generates the first control signal $n_1$ and the second control signal $n_2$. In this embodiment, the control unit 6 controls the fuel engine 4, the first switch $S_1$ and the second switch $S_2$ based on the first detector signal $m_1$ and the second detector signal $m_2$.

Figure 3:
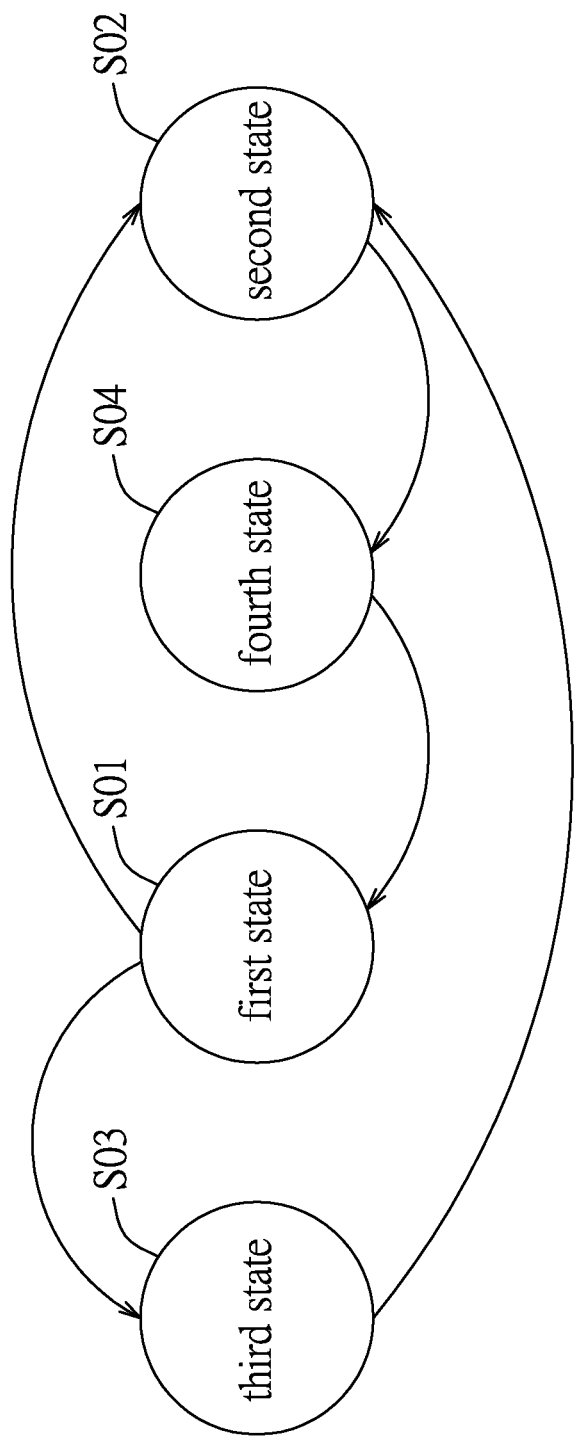
FIG. 3 is a schematic diagram illustrating finite states related to operation of the hybrid electric vehicle in the preferred embodiment of the present invention.

Referring further to FIG. 3, the hybrid electric vehicle 100 operates in a first state S01 when the control unit 6 determines that the battery level of the first battery $B_1$ is greater than a first predetermined battery level, and that the battery level of the second battery $B_2$ is not greater than a second predetermined battery level. While the hybrid electric vehicle 100 operates in the first state S01, the control unit 6 is operable to activate the fuel engine 4, controls the first switch $S_1$ to electrically connect the third terminal of the first switch $S_1$ with the second terminal of the first switch $S_1$ and electrically disconnect the third terminal of the first switch $S_1$ from the first terminal of the first switch $S_1$ such that the second battery $B_2$ is recharged by the generator 5, and controls the second switch $S_2$ to electrically connect the third terminal of the second switch $S_2$ with the first terminal of the second switch $S_2$ and electrically disconnect the third terminal of the second switch $S_2$ from the second terminal of the second switch $S_2$ such that the first battery $B_1$ provides electricity to the electric motor 3.

The hybrid electric vehicle 100 transitions from operation in the first state S01 to operation in a second state S02 when the control unit 6 determines, while the hybrid electric vehicle 100 operates in the first state S01, that the battery level of the first battery $B_1$ drops to the first predetermined battery level, and that the battery level of the second battery $B_2$ rises to be greater than the second predetermined battery level.

While the hybrid electric vehicle 100 operates in the second state S02, the control unit 6 is operable to activate the fuel engine 4, controls the first switch $S_1$ to electrically connect the third terminal of the first switch $S_1$ with the first terminal of the first switch $S_1$ and electrically disconnect the third terminal of the first switch $S_1$ from the second terminal of the first switch $S_1$ such that the first battery $B_1$ is recharged by the generator 5, and controls the second switch $S_2$ to electrically connect the third terminal of the second switch $S_2$ from the second terminal of the second switch $S_2$ and electrically disconnect the third terminal of the second switch $S_2$ with the first terminal of the second switch $S_2$ such that the second battery $B_2$ provides electricity to the electric motor 3.

The hybrid electric vehicle 100 transitions from operation in the second state S02 to operation in the first state S01 when the control unit 6 determines, while the hybrid electric vehicle 100 operates in the second state S02, that the battery level of the second battery $B_2$ drops to the second predetermined battery level, and that the battery level of the first battery $B_1$ rises to be greater than the first predetermined level.

The hybrid electric vehicle 100 transitions from operation in the first state S01 to operation in a third state S03 when the control unit 6 determines, while the hybrid electric vehicle 100 operates in the first state S01, that the battery level of the first battery $B_1$ is above the first predetermined battery level, and that the battery level of the second battery $B_2$ rises to a third predetermined battery level that is higher than the second predetermined battery level. While the hybrid electric vehicle 100 operates in the third state S03, the control unit 6 is operable to control the second switch $S_2$ such that the first battery $B_1$ continues to provide electricity to the electric motor 3, and the control unit 6 is operable to deactivate the fuel engine 4, such that recharging of the second battery $B_2$ is stopped, thus preventing overcharging of the second battery $B_2$.

The hybrid electric vehicle 100 transitions from operation in the third state S03 to operation in the second state S02 when the control unit 6 determines, while the hybrid electric vehicle 100 operates in the third state S03, that the battery level of the first battery $B_1$ drops to the first predetermined battery level.

The hybrid electric vehicle 100 transitions from operation in the second state S02 to operation in a fourth state S04 when the control unit 6 determines, while the hybrid electric vehicle 100 operates in the second state S02, that the battery level of the second battery $B_2$ is above the second predetermined battery level, and that the battery level of the first battery $B_1$ rises to a fourth predetermined battery level that is higher than the first predetermined battery level.

While the hybrid electric vehicle 100 operates in the fourth state S04, the control unit 6 is operable to control the second switch $S_2$ such that the second battery $B_2$ continues to provide electricity to the electric motor 3, and the control unit 6 is operable to deactivate the fuel engine 4, such that recharging of the first battery $B_1$ is stopped, thus preventing overcharging of the second battery $B_1$.

The hybrid electric vehicle 100 transitions from operation in the fourth state S04 to operation in the first state S01 when the control unit 6 determines, while the hybrid electric vehicle 100 operates in the fourth state S04, that the battery level of the second battery $B_2$ drops to the second predetermined battery level.

In summary, the battery unit 2 in the hybrid electric vehicle 100 of the present invention is charged by the generator 5 that is coupled with the fuel engine 4, effectively prolonging the operating time of the hybrid electric vehicle 100. By this virtue, the hybrid electric vehicle 100 does not have to immediately travel to a specific location for charging when the battery is low. The control unit 6, according to the battery levels of the first battery $B_1$ and the second battery $B_2$, controls the fuel engine 4, the first switch $S_1$ and the second switch $S_2$ to switch operation of the hybrid electric vehicle 100 among the first state S01, the second state S02, the third state S03 and the fourth state S04. By such virtue, the electric motor 3 is continuously supplied with electricity from one of the first battery $B_1$ and the second battery $B_2$. This prevents simultaneous charging and discharging of the first battery $B_1$ or the second battery $B_2$, prolonging service life of the first battery $B_1$ and the second battery $B_2$.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A hybrid electric vehicle comprising:
  a wheel;
  a wheel driving device coupled with the wheel for driving rotation of the wheel, the wheel driving device including an electric motor;
  a battery unit for providing electricity to the electric motor, the battery unit including a first battery and a second battery that are rechargeable;
  a generator for recharging the first battery and the second battery;
  a fuel engine coupled with the generator and operable to drive the generator to generate electricity;
  a first switch for establishing electrical connection between the generator and each of the first battery and the second battery;
  a second switch for establishing electrical connection between the electric motor and each of the first battery and the second battery;

a control unit electrically coupled with the first switch and the second switch and operable to control the first switch and the second switch to make or break electrical connection, a first detector electrically coupled with the control unit and the first battery, and operable to detect a battery level of the first battery and to generate a first detector signal that is based on the battery level of the first battery; and a second detector electrically coupled with the control unit and the second battery, and operable to detect a battery level of the second battery and to generate a second detector signal that is based on the battery level of the second battery, wherein:

the first switch has a first terminal electrically coupled with the first battery, a second terminal electrically coupled with the second battery, a third terminal electrically coupled with the generator, and a fourth terminal electrically coupled the control unit for receiving a first control signal, the second switch has a first terminal electrically coupled with the first battery, a second terminal electrically coupled with the second batter, a third terminal electrically coupled with the electric motor, and a fourth terminal electrically coupled with the control unit for receiving a second control signal, the control unit is further coupled electrically to the fuel engine, and controls operations of the fuel engine, the first switch and the second switch based on the first detector signal and the second detector signal, the hybrid electric vehicle operates in a first state which the control unit determines that the battery level of the first battery is greater than a first predetermined battery level, and that the battery level of the second battery is not greater than a second predetermined battery level, and while the hybrid electric vehicle operates in the first state, the control unit is operable to activate the fuel engine, controls the first switch to electrically connect the third terminal of the first switch with the second terminal of the first switch and electrically disconnect the third terminal of the first switch from the first terminal of the first switch such that the second battery is recharged by the generator, and controls the second switch to electrically connect the third terminal of the second switch with the first terminal of the second switch and electrically disconnect the third terminal of the second switch from second terminal of the second switch such that the first battery provides electricity to the electric motor.

2. The hybrid electric vehicle as claimed in claim 1, wherein the control unit controls the first switch such that the first battery and the second battery are not connected to the generator at the same time, and controls the second switch such that the first battery and the second battery are not connected to the electric motor at the same time.

3. The hybrid electric vehicle as claimed in claim 1, wherein:

the hybrid electric vehicle transitions from operation in the first state to operation in a second state when the control unit determines, while the hybrid electric vehicle operates in the first state, that the battery level of the first battery drops to the first predetermined battery level, and that the battery level of the second battery rises to be greater than the second predetermined battery level; and while the hybrid electric vehicle operates in the second state, the control unit is operable to activate the fuel engine, controls the first switch to electrically connect the third terminal of the first switch with the first terminal of the first switch and electrically disconnect the third terminal of the first switch from the second terminal of the first switch such that the first battery is recharged by the generator, and controls the second switch to electrically connect the third terminal of the second switch with the second terminal of the second switch and electrically disconnect the third terminal of the second switch from the first terminal of the second switch such that the second battery provides electricity to the electric motor.

4. The hybrid electric vehicle as claimed in claim 3, wherein:

the hybrid electric vehicle transitions from operation in the second state to operation in the first state when the control unit determines, while the hybrid electric vehicle operates in the second state, that the battery level of the second battery drops to the second predetermined battery level, and that the battery level of the first battery rises to be greater than the first predetermined level.

5. The hybrid electric vehicle as claimed in claim 4, wherein:

the hybrid electric vehicle transitions from operation in the first state to operation in a third state when the control unit determines, while the hybrid electric vehicle operates in the first state, that the battery level of the first battery is above the first predetermined battery level, and that the battery level of the second battery rises to a third predetermined battery level that is higher than the second predetermined battery level; and while the hybrid electric vehicle operates in the third state, the control unit is operable to deactivate the fuel engine, such that recharging of the second battery is stopped.

6. The hybrid electric vehicle as claimed in claim 5, wherein:

while the hybrid electric vehicle operates in the third state, the control unit controls the second switch such that the first battery continues to provide electricity to the electric motor.

7. The hybrid electric vehicle as claimed in claim 6, wherein:

the hybrid electric vehicle transitions from operation in the third state to operation in the second state when the control unit determines, while the hybrid electric vehicle operates in the third state, that the battery level of the first battery drops to the first predetermined battery level.

8. The hybrid electric vehicle as claimed in claim 4, wherein:

the hybrid electric vehicle transitions from operation in the second state to operation in a fourth state when the control unit determines, while the hybrid electric vehicle operates in the second state, that the battery level of the second battery is above the second predetermined battery level, and that the battery level of the first battery rises to a fourth predetermined battery level that is higher than the first predetermined battery level; and while the hybrid electric vehicle operates in the fourth state, the control unit is operable to deactivate the fuel engine, such that recharging of the first battery is stopped.

9. The hybrid electric vehicle as claimed in claim 8, wherein:

while the hybrid electric vehicle operates in the fourth state, the control unit controls the second switch such that the second battery continues to provide electricity to the electric motor.

10. The hybrid electric vehicle as claimed in claim 9, wherein:
   the hybrid electric vehicle transitions from operation in the fourth state to operation in the first state when the control unit determines, while the hybrid electric vehicle operates in the fourth state, that the battery level of the second battery drops to the second predetermined battery level.

* * * * *